(12) United States Patent
Miller et al.

(10) Patent No.: US 10,063,086 B2
(45) Date of Patent: Aug. 28, 2018

(54) PORTABLE POWER CHARGER KIT FOR WIRELESSLY RECHARGING ELECTRONIC DEVICES

(71) Applicant: Halo2Cloud, Glastonbury, CT (US)

(72) Inventors: Garold C. Miller, Glastonbury, CT (US); Nathan Daniel Weinstein, Glastonbury, CT (US)

(73) Assignee: HALO INTERNATIONAL SEZC LTD., Georgetown (KY)

( * ) Notice: Subject to any disclaimer, the term of this patent is extended or adjusted under 35 U.S.C. 154(b) by 120 days.

(21) Appl. No.: 14/934,511

(22) Filed: Nov. 6, 2015

(65) Prior Publication Data

US 2016/0134153 A1   May 12, 2016

Related U.S. Application Data

(60) Provisional application No. 62/076,017, filed on Nov. 6, 2014.

(51) Int. Cl.
| | |
|---|---|
| *H01M 10/46* | (2006.01) |
| *H02J 7/02* | (2016.01) |
| *H02J 7/00* | (2006.01) |
| *H02J 50/10* | (2016.01) |

(52) U.S. Cl.
CPC ............ *H02J 7/025* (2013.01); *H02J 7/0042* (2013.01); *H02J 7/0055* (2013.01); *H02J 50/10* (2016.02); *H02J 7/0054* (2013.01); *H02J 2007/0062* (2013.01)

(58) Field of Classification Search
CPC .. H02J 7/355; H02J 5/005; H02J 7/025; H02J 7/0042

USPC ..... 320/107, 108, 111, 114, 115; 2/247, 253
See application file for complete search history.

(56) References Cited

U.S. PATENT DOCUMENTS

| | | | | |
|---|---|---|---|---|
| 7,076,206 B2* | 7/2006 | Elferich | ................ | H02J 5/005 |
| | | | | 219/629 |
| 8,884,538 B2 | 11/2014 | Edwards | | |
| 9,614,371 B1* | 4/2017 | Farkas | ...................... | H02J 3/14 |
| 2004/0222638 A1* | 11/2004 | Bednyak | .................... | B63J 3/04 |
| | | | | 290/1 R |
| 2006/0087282 A1* | 4/2006 | Baarman | ................. | H02J 50/10 |
| | | | | 320/108 |
| 2009/0218884 A1* | 9/2009 | Soar | ......................... | F41H 1/02 |
| | | | | 307/11 |
| 2011/0018498 A1* | 1/2011 | Soar | ........................ | B60N 2/44 |
| | | | | 320/108 |
| 2012/0153740 A1* | 6/2012 | Soar | ........................ | F41H 1/02 |
| | | | | 307/104 |
| 2012/0320510 A1* | 12/2012 | Varga | ....................... | H02J 7/32 |
| | | | | 361/679.03 |
| 2013/0005251 A1* | 1/2013 | Soar | ..................... | B60N 2/4876 |
| | | | | 455/41.1 |

(Continued)

FOREIGN PATENT DOCUMENTS

WO        2015100415 A1      7/2015

*Primary Examiner* — Edward Tso
(74) *Attorney, Agent, or Firm* — McCormick, Paulding & Huber LLP

(57) ABSTRACT

A portable power charging kit includes a portable power charging unit comprising a charger housing and a unit of clothing adapted for receiving the portable power charging unit and for aligning the portable power charging unit to an electronic device to be recharged.

18 Claims, 1 Drawing Sheet

(56) References Cited

U.S. PATENT DOCUMENTS

2013/0214931 A1\* 8/2013 Chia .................... H02J 7/0042
340/815.4
2015/0188340 A1 7/2015 Edwards \* cited by examiner

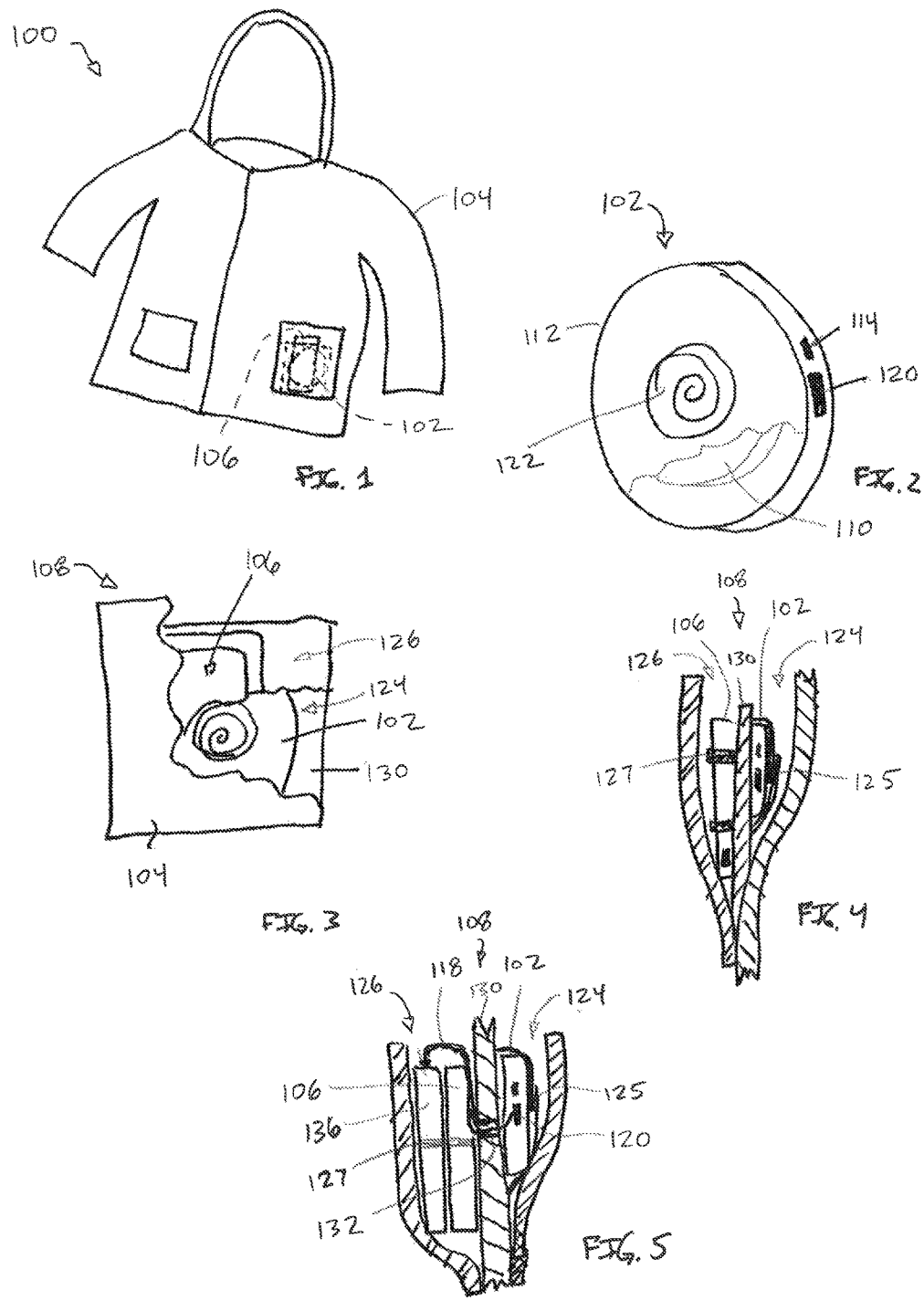

PORTABLE POWER CHARGER KIT FOR WIRELESSLY RECHARGING ELECTRONIC DEVICES

CROSS-REFERENCE TO RELATED APPLICATIONS

The present application is a non-provisional of and claims the benefit of U.S. Provisional Application 62/076,017 filed Nov. 6, 2014, which is incorporated herein by reference.

BACKGROUND

Technical Field

The present disclosure generally relates to a portable power charging kit, and more particularly relates to a portable charger kit for charging electronic devices in active, on-the-go situations in a variety of manners, including via direct connection or via wireless power transmission.

Background of the Invention

Present day consumers typically own several electronic devices specifically designed for portability and on-the-go use, including, for example, a mobile phone or smart phone, a portable music player like an iPod® or an MP3 player, a tablet, a portable gaming unit, a camera, and the like. Each of these devices requires frequent recharging. Such electronic devices typically utilize a cable for connecting the device to a power source, such as a wall outlet, a car charger, an airplane charger, or a computer. However, a separate cable is usually required for each power source. Moreover, different electronic devices often utilize different connection ports and interfaces such that a single charging cable is not compatible with multiple devices. Accordingly, a tech-savvy consumer, with several electronic devices, will usually have multiple charging cables to keep track of. Even then, the consumer may be without sufficient power to recharge a phone due to bad weather or a power outage, or may not always be in a place where a power source is readily available, or even if so, may not have the appropriate cable or adapter available to use with a particular power source. In many on-the-go scenarios, it is desirable to ensure that one's electronic devices have ample charge, especially in potential emergency situations, so that a phone call can be made from a smart phone when needed. Accordingly, a portable battery charger is advantageous to recharge electronic devices when a standard external power source is not readily available.

Portable power chargers exist that permit recharging of electronic devices when a standard power source is not readily available. For example, portable power chargers are illustrated and described in co-pending U.S. patent application Ser. No. 13/571,992, filed Aug. 10, 2012, and Ser. No. 13/682,985, filed Nov. 21, 2012, which share common inventors with the present application and which are incorporated herein by reference. Many of these portable charger devices typically require a charging cable to connect the device in need of recharging to the portable battery charger. While this direct connection is advantageous in most on-the-go scenarios, especially when the user is "at rest", such as in a car or at a restaurant, charging an electronic device by directly connecting it to the portable battery charger occasionally has its disadvantages, such as when the user is in motion, for example, running, hiking, skiing or biking. In such active, on-the-go situations, the charging cable can easily be dislodged from either the electronic device, or the portable battery charging, or both, which will inhibit the charging process. Indeed, it is in these types of situations where it is extremely important for an electronic device, such as a cellphone, has enough charge. For example, when skiing or hiking, or in a location that is remote, it is important to have some charge on a cellphone in case of an emergency, such as being stranded or hurt. If there is no charge, then it will be difficult to contact someone for help. Additionally, if the user thought that the electronic device was being charged and wasn't aware that the charging cable got snagged and unplugged, they may be without a charge when one is most needed.

Accordingly, it is desirable to provide a means of recharging electronic devices for such active, on-the-go situations, where the user doesn't need to worry about the charging process, or continually stop doing what they are doing to check to make sure the charging connection hasn't been broken (e.g., a cable came unplugged).

Wireless power chargers have been introduced to the market, especially for mobile electronic devices, that have provided additional approaches to recharging portable electronic devices. One such portable wireless power charger is shown and described in co-pending U.S. patent application Ser. No. 14/220,524, filed Mar. 20, 2014, which shares common inventors with the present application and which is incorporated herein by reference. Such wireless power transmission devices have been developed in connection with wireless charging standardization efforts, including by the Wireless Power Consortium (WPC), which have led to the adoption of devices that permit recharging of electronic devices without the use of separate chargers for each device. More particularly, the WPC has introduced the Qi wireless charging standard. Qi, which translates to "vital energy," takes its name from the Chinese concept of intangible flow of power and utilizes magnetic coil induction to transmit a charge from a transmitter to a receiver via a magnetic field.

Commonly, a wireless power transmission device utilizing magnetic coil induction includes a charging mat that must be connected to an external power source, such as a wall socket or a car charger socket, in order to transmit power wirelessly. The charging mat includes a transmitter having a coil. When a current is passed through the transmitter coil, a magnetic field is generated and transmitted to an electronic device placed on the charging mat. Such a device, in order to be wirelessly charged via the charging mat, must include a receiver having a coil, typically connected to the internal battery of the electronic device. When the electronic device is placed on an energized charging mat in a particular location, the receiver receives the wirelessly transmitted power in the form of a magnetic field, which induces a voltage in the receiver coil that can be used to power the electronic device or charge the internal battery of such a device.

In accordance with such wireless charging technology, it is important to ensure that the device in need of a charge is properly aligned with the wireless transmitter of the power charger. In active, on-the-go situations, such as skiing, biking, running or hiking, it may be difficult to ensure such a wireless connection is maintained. Accordingly, there is a need for such a system and device where wireless charging capabilities can be used without affecting the charging process.

Various drawbacks of prior art wireless power chargers have been identified. For example, such wireless chargers are not easily portable and require connection to an external power source for operation. Such external power sources are often not readily available, which makes the charger useless for on-the-go use. Additionally, some charging mat designs are often too small to be able to charge more than one electronic device at the same time. As noted, some wireless charging mats require a device to be placed in a particular spot—e.g., a Qi spot—where the transmitter and receiver coils must be aligned in order for a charge to be transmitted. Increasing the size of the charging mat may be undesirable, as it may take up too much space or be aesthetically unpleasing.

With traditional power sources, such as those noted above, it is often difficult to charge multiple devices at the same time, especially where each device requires a separate charging cable. For example, a car charger port may only handle a single cable at a time. Adaptor devices are available on the market for connecting multiple devices to a power source at the same time—for example, a two-to-one or three-to-one car charger splitter. However, such adapters are often only compatible with certain interfaces. Moreover, such adapters are separate from portable power sources and tend to be bulky.

Similarly, connection interface attachments are also available for adapting a charging cable for use with a variety of devices for recharging from a power source, each requiring a different interface connection. However, such attachments are usually separate small pieces, and therefore difficult to keep track of when not in use. Further, use of such attachments does not solve the problem presented by the need to charge multiple devices at the same time, from the same power source, as oftentimes, only one attachment can be used with a charging cable at a time.

Further, some portable charger devices will not permit recharging from the charger when the charger is itself being recharged or connected to an external power source. Such devices require the charger unit to be disconnected from a power source before a charge will be passed on to a device connected to the charger, or require the charger unit to be fully charged first before any device connected to the charger unit can then be recharged.

In view of the foregoing, there is a need for a portable power charger kit that can be used to charge a variety of electronic devices, including but not limited to smart phones, mobile phones, data tablets, music players, cameras, camcorders, gaming units, e-books, Bluetooth® headsets and earpieces, GPS devices, and the like, either individually or simultaneously in various combinations. Additionally, there is a need for such a charger kit that is portable, has a compact size, and is easy to use in various conditions and locations to charge one or more electronic devices simultaneously, including but not limited to in a house or office, a car or an airplane, as well as in active, on-the-go situations, such as running, hiking, biking and skiing, without compromising operation and performance. Still further, there is a need for a portable charger kit that can be recharged from an external power source or from a wireless power transmission device, providing increase flexibility and convenience of use for the portable charger. Still further, there is a need for a portable charger that can recharge its internal battery from an external power source or a wireless charging device at the same time as an electronic device connected to the charger, either directly or wirelessly, is being recharged by or via the charger unit. Still further, there is a need for a portable charger unit for such a kit in a compact size that has increased functionality for a user requiring a portable source of power. Accordingly, an aspect of the present disclosure is to provide a portable charger kit that improves upon conventional power chargers currently on the market and that overcomes the problems and drawbacks associated with such prior art power chargers and portable power chargers.

SUMMARY OF THE INVENTION

In accordance with the present disclosure, a portable power charger kit is provided for charging one or more portable electronic devices. In general, a portable power charger kit in accordance with the present disclosure includes a portable power charger unit having an internal rechargeable battery unit for connecting to and recharging one or more electronic devices, as necessary, and wireless power transmission components, such as a receiver and a transmitter, for recharging the charger unit as well as electronic devices via wireless power transmission methods. The portable charger kit may also include at least one connector cable for connecting the power charger unit with an external power source, or at least one electronic device, or both. Similarly, the portable charger unit may also include at least one power connection port for connecting the power charger unit with an external power source, or at least one electronic device, or both.

In an aspect of the present disclosure, the charger unit comprises a charger housing with at least one power connection port that can function as a power input, a power output, or both. A rechargeable internal battery is disposed within the charger housing and is operatively connected with the power connection port for providing an electrical charge from an external power source for recharging the internal battery when the charger unit is connected to the power source via the power connection port (acting as a power input) and/or for charging other electronic devices from the internal battery via the power connection port (acting as a power output). The charger unit is portable as a result of the small size of the housing. Despite the small size of the unit, the power capacity is very high so that the charger can accommodate multiple electronic devices at the same time.

In another aspect of the present disclosure, a charger unit with wireless transmission components, such as both a transmitter and a receiver, can be embedded or incorporated into the fabric of a unit of clothing, for example sewn into the fabric lining a pocket of the unit of clothing, for recharging electronic devices placed within the pocket. In such an embodiment, the charging unit can itself be recharged whenever the article of clothing is placed in proximity to a wireless charging device. For example, a charging unit that is embedded into a jacket pocket can be recharged when the jacket is hung up with its pocket in proximity to a wall-mounted wireless charging device. Additionally, the pocket or other portion of the unit of clothing can include an opening through which a charging cable can be fed for direct charging of the charging unit.

In another aspect of the present disclosure, the charger unit includes a wireless transmitter operatively connected to the internal battery for transmitting a power charge to an electronic device having a wireless receiver. The charger unit may further include a wireless receiver operatively connected to the internal battery for receiving a power charge from a power source having a wireless transmitter. In embodiments of the charger unit including both a wireless transmitter and a wireless receiver, the charger unit can both be charged wirelessly, for example, when placed on a wireless power transmission device (e.g., wireless charging mat), and charge other devices wirelessly, for example, when a device is placed on the charger housing.

The portable power charger kit in accordance with the present disclosure also comprises a unit of clothing provided with at least two pre-aligned pockets, one designated for the portable power charger unit and one designated for an electronic device preferably pre-equipped with a wireless receiver for charging via wireless transmission means. The first pocket—designated for the portable charger unit—is especially sized to the shape and size of the charger unit so that the position of the charger unit, and thus the wireless transmitter contained therein, is known. The second pocket—designated for an electronic device in need of recharging (e.g., smart phone)—is designed to align the electronic device so that it can be recharged by wireless means even in active, on-the-go situations. That is, when the user is moving about, the electronic device is maintained in alignment with the power charger unit so that the electronic device can recharge and be usable when needed, especially in a possible emergency situation.

In embodiments of the present disclosure, the unit of clothing can be a jacket, a sweatshirt, a shirt, pants or shorts. The pockets may include straps secured by known fasteners, such as snaps, buttons, tabs, clasps, hook-and-loop fasteners, or the like, to further secure the power charger unit and the electronic device(s) in place during on-the-go activity. The first and second pockets are separated by a wall of fabric that will not inhibit the charging process. This wall of fabric may further include an opening through which a charging cable may be fed for direct charging of the electronic device (if the device is not equipped with an appropriate wireless receiver) or for directly charging an additional electronic device while a first device is being charged through wireless means.

In certain embodiments, the first pocket may be accessible through an opening on the interior of the unit of clothing, while the second pocket is accessible through an opening on the exterior of the unit of clothing. Alternatively, both pockets may be accessed through a common opening, either on the interior or the exterior of the unit of clothing. Such openings can be closed through known means, such as by zippers, buttons, flaps, hook-and-loop fasteners, and the like, to further secure the devices within their respective pockets.

In additional embodiments of the portable power charger kit in accordance with the present disclosure, the kit may comprise a bag, backpack, tote or purse having the two pocket set-up such as described above.

In embodiments of the present disclosure, the power connection port can comprise a female port adapted for receiving a complementary male connection interface of a standard charging cable, which connects at an opposite end to a portable electronic device. In other embodiments, the power connection port can be a charging cable attached to the charger housing and preferably stored within the charger housing when not in use. In preferred embodiments of the present disclosure, the charger unit includes both wireless charging capabilities, and direct charging connectivity.

In additional embodiments of the charger unit of the present disclosure, one or more connector cables, each having a respective connection interface, is attached to the charger housing and operatively connected to a respective power connection port of the charger unit. Preferably, the charger housing includes one or more cavity in which each connector cable may be stored, when not in use, and from which each connector cable may be removed when needed for recharging an electronic device. In a more preferable embodiment of the charger unit, the unit includes multiple connector cables each with a respective storage cavity formed in the charger housing, thereby permitting multiple electronic devices to be charged by the charger unit simultaneously.

In various embodiments of the present disclosure, the charger unit may further comprise a controller or processing unit, which can control wireless and direct connectivity with the charger unit, keep track of the capacity level of the battery unit, store data or provide a conduit means by which data can be exchanged between electronic devices, such as between a smart phone and a computer.

These and other objects, features and advantages of the present disclosure will become apparent in light of the detailed description of embodiments thereof, as illustrated in the accompanying drawings.

BRIEF DESCRIPTION OF THE DRAWINGS

FIG. 1 shows a schematic representation of a portable power charger kit in accordance with the present invention.

FIG. 2 illustrates in a partial cutaway view a portable power charger unit for use in the portable power charger kit of FIG. 1.

FIG. 3 illustrates a partial break-away view of unit of clothing adapted for receiving and aligning the portable power charger unit of FIG. 2 and an electronic device in need of a charge.

FIG. 4 illustrates a cross-sectional view of a first embodiment of the portable power charger kit of FIG. 1 with the portable power charger unit of FIG. 2 and an electronic device in need of a charge.

FIG. 5 illustrates a cross-sectional view of a second embodiment of the portable power charger kit of FIG. 1 with the portable power charger unit of FIG. 2 and two electronic devices in need of a charge, one being wirelessly charged from the charger unit and the other being directly charged from the charger unit via a charging cable.

DETAILED DESCRIPTION

A portable power charger kit 100 in accordance with an embodiment of the present disclosure is shown in FIGS. 1-5. The portable power charger kit 100, as illustrated in FIGS. 1 and 3, generally comprises a portable power charger unit 102 and a unit of clothing 104 adapted for receiving the charger unit 102 and aligning it with an electronic device 106 in need of a charge. The unit of clothing 104 may be a jacket, sweatshirt, shirt, pants or shorts such as commonly worn by a person involved in an active, on-the-go activity, such as running, hiking, biking or skiing. As discussed further below and shown in various embodiments in FIGS. 4 and 5, the unit of clothing 104 includes a multi-pocket system 108 designed for holding, positioning and securing the portable power charger unit 102 and an electronic device 106 in place for charging during an active, on-the-go activity. In alternate embodiments of the present disclosure, the unit of clothing 104 may be replaced by a bag, backpack, tote, purse or the like without departing from the principles and spirit of the present disclosure.

The portable charger unit 102 for the kit 100 of the present disclosure generally includes a rechargeable internal battery unit 110 disposed within a charger housing 112. The power charger unit 102, as generally illustrated in FIG. 2, is designed for portability and convenient on-the-go use to recharge one or more portable electronic devices 106. The power charger unit 102 is also designed for easy and flexible recharging of the internal battery 110 from a variety of power sources so that it can be easily charged up to have sufficient battery capacity when it is needed to recharge a portable electronic device 106.

Referring to FIG. 2, the charger unit 102 has a disk-shape though other shapes and sizes may be used without departing from the spirit and principles of the present disclosure. The internal battery unit 110 of the portable power charger unit 102 is capable of being recharged in a variety of manners, including via direct connection with an external power source via a power input connector cable provided with the charger unit 102, via direct connection with an external power source via a separate connector cable that engages a power input connection port 114 provided on the charger housing 112, or via wireless power transmission means. A portable power charger in accordance with the present disclosure can include any or all of these recharging features in various combinations without departing from the principles and spirit of the present disclosure.

Similarly, the power charger unit 102 can be used to recharge one or more portable electronic devices 106 in a variety of manners, including via direct connection with an electronic device 106 via a power output connector cable provided with the charger unit 102, via direct connection with an electronic device 106 via a separate connector cable 118 that engages a power output connection port 120 provided on the charger housing 112, or via wireless power transmission means. A portable power charger in accordance with the present disclosure can include any or all of these recharging features in various combinations without departing from the principles and spirit of the present disclosure.

As noted, the portable power charger unit 102 is equipped with components for wireless power transmission, both from an external power source, such as a wireless charging mat as is known in the art, and to an electronic device 106. In this regard, the power charger unit 102 includes a wireless transmitter 122 for transmitting a charge to an electronic device 106 and a wireless receiver (not shown) for receiving a charge from a wireless charging mat or power transmitting device.

The wireless transmitter 122 of the power charger unit 102 generally comprises a magnetic induction coil operatively connected to the internal battery unit 110. When the charger unit 102 is positioned within the multi-pocket system 108, as further described below, a wireless transmission area generally aligned with the transmitter coil is positioned at a known location within the unit of clothing 104. When an electronic device 106 that includes a wireless receiver is aligned with the wireless transmission area, a magnetic field generated by the transmitter is transmitted to the electronic device 106, where a voltage is induced to power the electronic device 106 or recharge its internal battery. In this regard, it is advantageous for optimal charging that the designated wireless transmission area is known to the user. This also facilitates proper alignment and wireless charging in active, on-the-go situations and activities. A power indicator may be provided to indicate that an electronic device 106 is being wirelessly charged from the power charger.

In an embodiment of the charger unit 102, the charger housing 112 includes the input power connection port 114 in the form of a micro-USB input for directly charging the internal battery 110 of the charger unit 102, and also includes an output power connection port 120 in the form of a USB output for directly charging an electronic device 106 from the internal battery 110 of the charger unit 102, as needed.

As discussed above, the portable power charger kit 100 in accordance with the present disclosure also comprises a unit of clothing 104. As illustrated in FIGS. 3-5, the unit of clothing 104 is provided with a multi-pocket system 108 that includes at least two pre-aligned pockets 124, 126. A first pocket 124 is designated for the portable power charger unit 102 and a second pocket 126 is designated for the electronic device 106, which preferably is pre-equipped with a wireless receiver for charging via wireless transmission means. The first pocket 124—designated for the portable charger unit 102—is especially sized to the shape and size of the charger unit 102 so that the position of the charger unit 102, and thus the wireless transmitter 122 contained therein, is known. The first pocket 124 may include a first set of straps 125 secured by known fasteners, such as snaps, buttons, tabs, clasps, hook-and-loop fasteners, or the like, to further secure the power charger unit 102 in place during on-the-go activity. The second pocket 126—designated for the electronic device 106 in need of recharging (e.g., smart phone)—is designed to align the electronic device 106 with the transmission area of the charger unit 102 so that the electronic device 106 can be recharged by wireless means even in active, on-the-go situations. That is, when the user is moving about, the electronic device 106 is maintained in alignment with the power charger unit 102 so that the electronic device 106 can recharge and be usable when needed, especially in a possible emergency situation. The second pocket 126 may include a second set of straps 127 secured by known fasteners, such as snaps, buttons, tabs, clasps, hook-and-loop fasteners, or the like, much like the first pocket 124, to further secure the electronic device 106 in place during on-the-go activity.

In certain embodiments of the unit of clothing 104, such as illustrated in FIGS. 3-5, the first pocket 124 and second pocket 126 are separated by a wall of fabric 130 that will not inhibit the charging process. The wall of fabric 130 may be a separate panel formed within a larger pocket to define the first pocket 124 and the second pocket 126 (FIG. 4). Alternatively, the wall of fabric 130 may be part of the unit of clothing 104, with separate pockets formed on either side thereof (FIG. 5). This wall of fabric 130 may further include an opening 132 through which a charging cable may be fed for direct charging of the electronic device 106 (if the device is not equipped with an appropriate wireless receiver) or for directly charging an additional electronic device 136 while a first device is being charged through wireless means, such as is illustrated in FIG. 5.

In certain embodiments, the wall of fabric 130 may incorporate a multi-layer functional fabric as disclosed in co-pending and commonly owned U.S. Provisional Application Ser. No. 62/232,013 filed Sep. 24, 2015, which is incorporated herein by reference. Further, an RF-protective layer of the wall of fabric 130 may be configured to couple with an inductive power transmitter so as to extend its range, i.e. either to wirelessly recharge the portable power charger unit 102 from an external source or to enhance wireless charging of the electronic device 106 from the adjacent portable power charger unit 102.

In certain embodiments, the first pocket 124 may be accessible through an opening on the interior of the unit of clothing 104, while the second pocket 146 is accessible through an opening on the exterior of the unit of clothing 104 (FIG. 5). Alternatively, both pockets may be accessed through a common opening, either on the interior or the exterior of the unit of clothing 104 (FIG. 4). Such openings can be closed through known means, such as by zippers, buttons, flaps, hook-and-loop fasteners, and the like, to further secure the devices within their respective pockets.

In alternate embodiments, a charger unit with wireless transmission components, such as both a transmitter and a receiver, can be embedded or incorporated into the fabric of a unit of clothing, for example sewn into the fabric lining a pocket of the unit of clothing, for recharging electronic devices placed within the pocket. In such an embodiment, the charging unit can itself be recharged whenever the article of clothing is placed in proximity to a wireless charging device. For example, a charging unit that is embedded into a jacket pocket can be recharged when the jacket is hung up with its pocket in proximity to a wall-mounted wireless charging device. Additionally, the pocket or other portion of the unit of clothing can include an opening through which a charging cable can be fed for direct charging of the charging unit.

In other embodiments, a portable power charging unit comprises a charger housing, a rechargeable battery within the charger housing, and a wireless power transmitter. A bag is adapted for receiving the portable power charging unit, within a multi-pocket system. The multi-pocket system includes a first pocket and a second pocket. The first pocket is sized to the shape of the portable power charging unit such that when the portable power charging unit is located within the first pocket the position of the portable power charging unit is known. The second pocket is configured to align an electronic device with the wireless power transmitter of the portable power charging unit.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A portable power charging kit comprising:
   a portable power charging unit comprising a charger housing having a rechargeable battery internally disposed therein; and
   a unit of clothing adapted for removably receiving the portable power charging unit and for aligning the portable power charging unit with an electronic device to be recharged.

2. The portable power charging kit of claim 1, wherein the portable power charging unit comprises a power input connector cable, and wherein the rechargeable internal battery is configured to be recharged via direct connection with an external power source via the power input connector cable.

3. The portable power charging kit of claim 1, wherein the charger housing comprises a power connection port, and wherein the rechargeable internal battery is configured to be recharged via direct connection with an external power source via a separate connector cable that engages the power connection port.

4. The portable power charging kit of claim 1, further comprising a wireless receiver, wherein the rechargeable internal battery is configured to be recharged by wireless power transmission.

5. The portable power charging kit of claim 1, wherein the portable power charging unit comprises a power output connector cable, and wherein the portable power charging unit is configured to recharge an electronic device via direct connection with the electronic device via the power output connector cable.

6. The portable power charging kit of claim 1, wherein the charger housing comprises a power connection port, and wherein the portable power charging unit is configured to recharge an electronic device via direct connection with the electronic device via a separate connector cable that engages the power connection port.

7. The portable power charging kit of claim 1, further comprising a wireless transmitter, wherein the portable power charging unit is configured to recharge an electronic device via wireless power transmission.

8. The portable power charging kit of claim 1, further comprising:
   a wireless receiver; and
   a wireless transmitter;
   wherein the rechargeable internal battery is configured to be recharged by wireless power transmission, and
   wherein the portable power charging unit is configured to recharge an electronic device via wireless power transmission.

9. The portable power charging kit of claim 1, wherein the charging housing comprises a micro-USB input for directly recharging the internal rechargeable battery.

10. The portable power charging kit of claim 1, wherein the charging housing comprises a USB output for directly charging an electronic device from the internal rechargeable battery.

11. The portable power charging kit of claim 1, where in the unit of clothing comprises a multi-pocket system, wherein the multi-pocket system is configured to hold, align and secure the portable power charging unit and an electronic device in place relative to one another for charging.

12. The portable power charging kit of claim 11, wherein the multi-pocket system comprises:
   a first pocket; and
   a second pocket;
   wherein the first pocket is sized to the shape of the portable power charging unit such that when the portable power charging unit is located within the first pocket the position of the portable power charging unit is known, and
   wherein the second pocket is configured to align an electronic device with a transmission area of the portable power charging unit for wireless charging.

13. The portable power charging kit of claim 12, wherein the second pocket comprises at least one strap configured to secure an electronic device.

14. The portable power charging kit of claim 12, wherein the multi-pocket system comprises a fabric wall separating the first pocket and second pocket, and wherein the fabric wall is configured to not inhibit the portable power charging unit from wirelessly charging the electronic device.

15. The portable power charging kit of claim 14, wherein the fabric wall comprises an opening capable of allowing a cable to extend through the opening from the first pocket into the second pocket.

16. The portable power charging kit of claim 14, wherein the first pocket is accessible through a first opening on the interior of the unit of the clothing, and wherein the second pocket is accessible through a second opening on the exterior of the unit of the clothing.

17. The portable power charging kit of claim 14, wherein the first pocket and the second pocket are accessible from a common opening.

18. A portable power charging kit comprising:
   a unit of clothing; and
   a portable power charging unit comprising a charger housing and a rechargeable battery unit internally disposed therein, said portable power charging unit being embedded between fabric layers of the unit of clothing,
   wherein the unit of clothing incorporates a pocket adapted for receiving an electronic device and placing said device in alignment with the embedded portable power charging unit.

* * * * *